W. Gale.

Straw Cutter.

No. 2,293. Reissued Jun. 26, 1866.

N. PETERS, PHOTO-LITHOGRAPHER, WASHINGTON, D. C.

UNITED STATES PATENT OFFICE.

WARREN GALE, OF CHICOPEE FALLS, MASSACHUSETTS.

IMPROVEMENT IN STRAW-CUTTERS.

Specification forming part of Letters Patent No. 10,592, dated March 7, 1854; Reissue No. 2,293, dated June 26, 1866.

*To all whom it may concern:*

Be it known that I, WARREN GALE, of Chicopee Falls, in the county of Hampden and State of Massachusetts, have invented an Improved Hay, Straw, and Stalk Cutter; and I do hereby declare that the following is a full and exact description thereof, reference being had to the accompanying drawings, making part of this specification—

Figure 1:
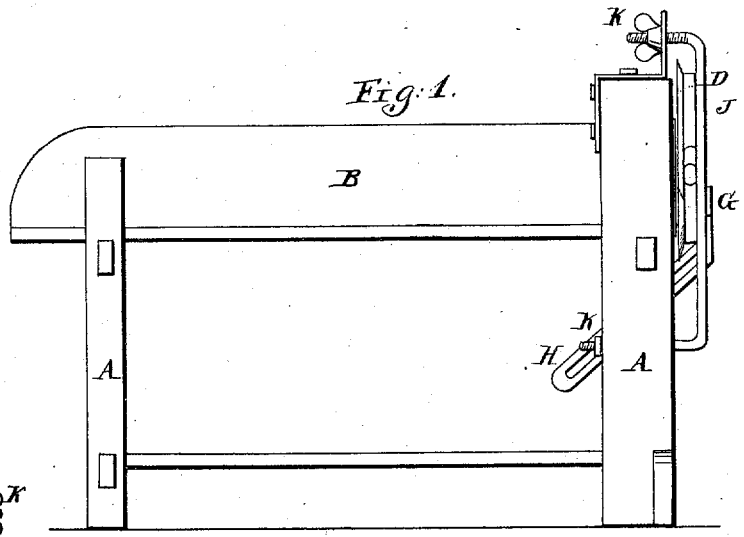
Figure 2:
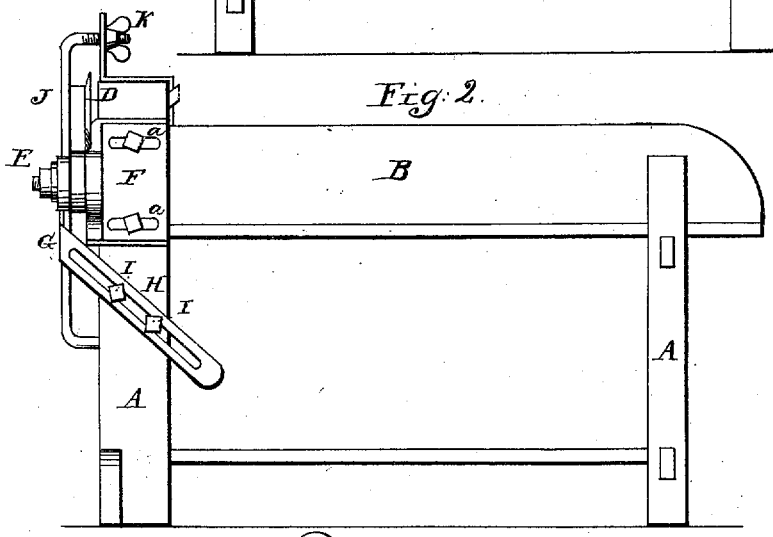
Figure 3:
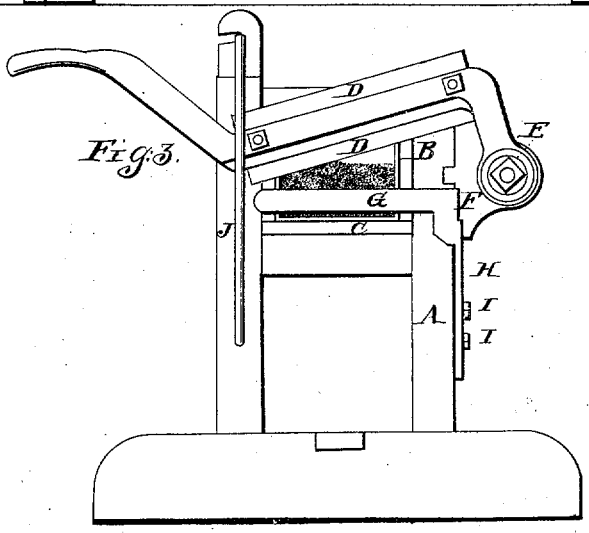

Figure 1 being a near-side view of a hay, straw, and stalk cutter provided with my improvements; Fig. 2, an off-side view of the same; Fig. 3, an end view thereof.

Like letters designate corresponding parts in all of the figures.

My improvements belong to the hand-lever cutters, there being the usual cutting-box B, mounted on a suitable frame, A. At the cutting end of the box is a mouth-piece, C, with a cutting-edge, generally made of chilled cast-iron, and this serves for the fixed or stationary knife, in connection with which the moving knife D cuts the hay, straw, or stalks in the manner of shears.

My first improvement consists in the employment of a fixed pivot, F, for the moving knife to work on, having slots *a a* in its flange for attaching it by bolts to the side of the cutting box or frame, so as to give the requisite adjustments to the knife in relation to the fixed knife, and being provided with a shoulder, against which the eye of the knife is continually held and adjusted close by a washer and nut, E, without the disturbance of the wearing-surfaces from any adjustment required.

The adjustments effected by means of this fixed pivot with its two slots *a*, *a*, or the equivalent thereof, and the only ones ever required, are—

First, in fitting the moving knife to the cutter, its edge is brought parallel with the edge of the fixed knife by properly shaping the surface of the wood to receive the pivot-flange. This surface once properly adapted to the pivot seldom requires any subsequent adjustment, which, however, is readily effected if necessary.

Second, an angular adjustment vertically, so as to move the back of the moving knife nearer to or farther from the fixed knife, in order to bring the edges of the two knives into the proper shearing contact with each other—a very essential matter in these cutters. Thus, if the back of the moving-knife should stand too far in, its inner edge would rub against the fixed knife and prevent the cutting-edge from coming in contact therewith; or if the back of the moving knife should stand too far out it would make the cutting harder, as well as cause the knife-edge to wear away unnecessarily fast; but this angular adjustment remedies such defects, and is effected by moving the upper or lower edge of the fixed pivot out or in the slots *a a* by moving on the tightening-bolts, thus allowing these movements.

Third, the fixed pivot is adjusted horizontally, so as to bring the moving knife bodily toward the fixed knife as close as desired without changing its angular position or parallelism in relation to said fixed knife. This adjustment is effected also by sliding the flange-slots on their tightening-bolts.

A single slot, *a*, in the flange of the pivot might serve the purpose of the two represented, but it would not be so firm and reliable, and it would need, if not require, two tightening-bolts. This fixed pivot on which the knife moves, besides furnishing the easiest, simplest, and most complete means of adjustment in all ways, also enables the knife to be constantly held close to its guide-shoulder by the counter-surface washer and screw-nut E, and having once worn the surfaces of contact smooth and regular they are never disturbed, as they would necessarily be if the adjustment of the knife itself were effected by the shoulders and washers; and the knife may be moved with its pivots in transporting the implement, so that the connection need never be disturbed from any cause.

The flange portion of the handle, to which the moving knife D is secured, has such a form as to place the knife in a position not radial to the pivot on which it moves, but so that its heel is raised above the radial line drawn from the pivot-center to its outer point of cut, thus tending to a tangential direction, thereby giving a drawing shear-cut thereto, the outer end cutting first upon the material. This position of the knife requires it to be carried down much farther in cutting than if it were in a radial position.

My second improvement consists in curving, bending, or in other form extending the helve portion of the moving-knife handle (or that portion which projects outward from the knife, so as to be grasped by the hand to work with) above the line of the flange portion, or above a radial line extending from the pivot-center through the outer cutting-point of the knife to a sufficient extent, or thereabout, to compensate for the additional lowering of the knife required by the raising of its heel above the radial line to give the drawing cut at each downward stroke.

When the knife is thus arranged this upward extension of the handle is very desirable; otherwise the operator is required to stoop uncomfortably, and cannot work to good advantage.

The moving knife is held up to the fixed knife at the side of the cutting-box opposite to that of the pivot by means of a vertical guide-bar, J, secured to the frame and adjustable thereto by screw-nuts K, so as to make its situation correspond with the adjustments of the fixed pivot.

My third improvement consists in the arrangement of an adjustable gage-plate, G, in front of the fixed knife in such a manner that it shall be raised above said fixed knife in proportion to the distance it is adjusted outward from it to give a longer cut, and vice versa. This is accomplished by providing the shank H of the gage (which is bent at right angles to the plane of the gage) with a longitudinal slot, through which tightening-bolts I I pass for adjusting the position of the gage.

When the length of the cut is diminished the tendency of the straw or stalks is to jam between the gage and the fixed knife, so that the gage has to be set low and let a considerable portion of the straw or stalks to fall over the same; but when the distance of the gage from the fixed knife is increased for a longer cut the tendency to jam between it and the fixed knife is diminished, so that it can be set higher and let more of the straw, hay, or stalks fall between the same and knife, so as to render the gaging more effectual and certain.

What I claim as my invention, and desire to secure by Letters Patent, is—

1. The fixed pivot F, on which the moving knife works, provided with a flange for fastening to the cutter-box, and made adjustable thereon by means of slots and bolts, or their equivalent, substantially as and for the purpose herein specified.

2. The arrangement of the adjustable gage-plate G in front of the fixed knife in such a manner that it shall be raised above the said fixed knife in proportion to the increased distance at which it is adjusted away from the knife to give a longer cut, and vice versa, substantially as herein set forth.

WARREN GALE.

Witnesses:
ANDREW GALE,
J. N. THAYER.